US012364929B1

(12) United States Patent
Zhao

(10) Patent No.: US 12,364,929 B1
(45) Date of Patent: *Jul. 22, 2025

(54) DEEP LEARNING SYSTEM FOR DATA-DRIVEN SKILL ESTIMATION

(71) Applicant: Electronic Arts Inc., Redwood City, CA (US)

(72) Inventor: Chong Zhao, Belmont, CA (US)

(73) Assignee: Electronic Arts Inc., Redwood City, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/972,470

(22) Filed: Oct. 24, 2022

Related U.S. Application Data

(63) Continuation of application No. 17/090,177, filed on Nov. 5, 2020, now Pat. No. 11,478,716.

(51) Int. Cl.
*A63F 13/798* (2014.01)
*A63F 13/795* (2014.01)

(52) U.S. Cl.
CPC .......... *A63F 13/798* (2014.09); *A63F 13/795* (2014.09)

(58) Field of Classification Search
CPC ...... A63F 13/67; A63F 13/795; A63F 13/798; A63F 2300/556; A63F 2300/5566; A63F 2300/558
See application file for complete search history.

(56) References Cited

U.S. PATENT DOCUMENTS

| 7,614,955 | B2 * | 11/2009 | Farnham | A63F 13/795 |
| | | | | 463/40 |
| 7,677,970 | B2 * | 3/2010 | O'Kelley, II | A63F 13/35 |
| | | | | 463/25 |
| 7,846,024 | B2 * | 12/2010 | Graepel | G07F 17/3276 |
| | | | | 700/91 |
| 8,425,331 | B2 | 4/2013 | Bortnik et al. | |
| 9,751,010 | B2 * | 9/2017 | Groset | H04L 67/566 |
| 9,795,887 | B2 * | 10/2017 | Lin | A63F 13/75 |
| 9,993,735 | B2 * | 6/2018 | Aghdaie | A63F 13/795 |
| 10,286,327 | B2 * | 5/2019 | Xue | A63F 13/35 |

(Continued)

OTHER PUBLICATIONS

Elo Rating System—retrieved from Wikipedia on Oct. 28, 2020 from https://en.wikipedia.org/wiki/Elo_rating_system, 19 pgs.

(Continued)

*Primary Examiner* — Milap Shah
(74) *Attorney, Agent, or Firm* — McDermott Will & Emery LLP

(57) ABSTRACT

Various aspects of the subject technology relate to systems, methods, and machine-readable media for determining player skill for video games. The method includes aggregating a plurality of player statistics for match outcomes from a plurality of video games. The method also includes calculating, for each player in a pool of players, a matchmaking rating for each player based on the plurality of player statistics, the matchmaking rating for each player comprising a predicted number of points each player will contribute to a match. The method also includes selecting, based on the matchmaking rating for each player, players from the pool of players. The method also includes matching the players based on the matchmaking rating for each player, a sum of the matchmaking ratings comprising a total predicted team score for the match.

19 Claims, 5 Drawing Sheets

(56) References Cited

U.S. PATENT DOCUMENTS

| | | | |
|---|---|---|---|
| 10,632,389 B1 | 4/2020 | Lu et al. | |
| 10,765,952 B2 * | 9/2020 | Trombetta | A63F 13/795 |
| 10,894,215 B1 | 1/2021 | Brown et al. | |
| 10,905,962 B2 * | 2/2021 | Kaethler | A63F 13/35 |
| 11,065,549 B2 * | 7/2021 | Rico | G06F 18/214 |
| 11,351,464 B2 | 6/2022 | Zhou et al. | |
| 2005/0192097 A1 | 9/2005 | Farnham et al. | |
| 2006/0121990 A1 | 6/2006 | O'Kelley, II et al. | |
| 2006/0258463 A1 * | 11/2006 | Cugno | A63F 13/795 463/42 |
| 2007/0026934 A1 | 2/2007 | Herbrich et al. | |
| 2007/0265718 A1 | 11/2007 | Graepel et al. | |
| 2009/0325709 A1 | 12/2009 | Shi | |
| 2012/0142429 A1 | 6/2012 | Muller | |
| 2014/0025732 A1 | 1/2014 | Lin et al. | |
| 2017/0080336 A1 | 3/2017 | Groset et al. | |
| 2017/0259178 A1 | 9/2017 | Aghdale et al. | |
| 2018/0111051 A1 | 4/2018 | Xue et al. | |
| 2018/0185759 A1 * | 7/2018 | Torres | A63F 13/795 |
| 2018/0221769 A1 * | 8/2018 | Kosai | H04L 67/125 |
| 2019/0228290 A1 | 7/2019 | Ruiz et al. | |
| 2020/0078688 A1 | 3/2020 | Kaethier et al. | |
| 2020/0094148 A1 | 3/2020 | Trombetta et al. | |
| 2020/0289943 A1 | 9/2020 | Rico et al. | |
| 2021/0023455 A1 | 1/2021 | Xue et al. | |
| 2021/0308588 A1 | 10/2021 | He et al. | |
| 2021/0331076 A1 | 10/2021 | Labate | |
| 2021/0394060 A1 * | 12/2021 | Yilmazcoban | G06F 18/214 |

OTHER PUBLICATIONS

Glicko Rating System—retrieved from Wikipedia on Oct. 28, 2020 from https://en.wikipedia.org/wiki/Glicko_rating_system, 3 pgs.

Glickman, M.E., "The Glicko System," retrieved on Oct. 28, 2020, from http://www.glicko.net/glicko/glicko.pdf, 6 pgs.

Glickman, M.E., "Example of the Glicko-2 System," retrieved on Oct. 28, 2020, from http://www.glicko.net/glicko/glicko2.pdf, 6 pgs.

Herbrich, R. et al., "TrueSkill™: A Bayesian Skill Rating System," retrieved on Oct. 28, 2020, from https://www.microsoft.com/en-us/research/publication/trueskilltm-a-bayesian-skill-rating-system/, 8 pgs.

Minka, T. et al., "TrueSkill 2: An Improved Bayesian skill rating system," retrieved on Oct. 28, 2020, from https://www.microsoft.com/en-us/research/publication/trueskill-2-improved-bayesian-skill-rating-system/, pp. 1-24.

Trueskill Rating System—retrieved from Wikipedia on Oct. 28, 2020 from https://en.wikipedia.org/wiki/TrueSkill, 2 pgs.

\* cited by examiner

DEEP LEARNING SYSTEM FOR DATA-DRIVEN SKILL ESTIMATION

CROSS REFERENCE TO RELATED APPLICATIONS

This present application claims the benefit of priority under 35 U.S.C. 120 as a continuation of U.S. patent application Ser. No. 17/090,177, filed Nov. 5, 2020, now allowed, the disclosure of which is hereby incorporated by reference in its entirety for all purposes.

TECHNICAL FIELD

The present disclosure generally relates to video games, and more particularly to data-driven skill estimation.

BACKGROUND

Video games, such as sports video games, first person shooter games, or other online games, often include a multiplayer mode allowing multiple players to connect online to interact with one another in the video game. Players may select a game mode they would like to play, and the video game may find other players looking to play the same game mode. The game will attempt to match players accordingly. However, various criteria may be utilized to match players together.

BRIEF SUMMARY

The subject disclosure provides for systems and methods for data-driven skill estimation for matchmaking in video games. In an aspect, a Siamese neural network is trained to estimate each player's skill on an individual basis based on that player's in-game statistics and a match outcome. The Siamese neural network may then predict all player skill values and match the players accordingly so that each match is evenly balanced based on the predicted player skills.

According to one embodiment of the present disclosure, a computer-implemented method for determining a player's skill for video games is provided. The method includes aggregating a plurality of player statistics for match outcomes from a plurality of different video games. The method also includes calculating, for each player in a pool of players, a matchmaking rating for each player based on the plurality of player statistics, the matchmaking rating for each player comprising a predicted number of points each player will contribute to a match. The method also includes selecting, based on the matchmaking rating for each player, players from the pool of players requesting to participate in the match. The method also includes matching the players based on the matchmaking rating for each player, a sum of the matchmaking ratings comprising a total predicted team score for the match.

According to one embodiment of the present disclosure, a system is provided including a processor and a memory comprising instructions stored thereon, which when executed by the processor, causes the processor to perform a method for determining a player's skill for video games. The method includes aggregating a plurality of player statistics for match outcomes from a plurality of different video games. The method also includes calculating, for each player in a pool of players, a matchmaking rating for each player based on the plurality of player statistics, the matchmaking rating for each player comprising a predicted number of points each player will contribute to a match. The method also includes selecting, based on the matchmaking rating for each player, players from the pool of players requesting to participate in the match. The method also includes matching the players based on the matchmaking rating for each player, a sum of the matchmaking ratings comprising a total predicted team score for the match.

According to one embodiment of the present disclosure, a non-transitory computer-readable storage medium is provided including instructions (e.g., stored sequences of instructions) that, when executed by a processor, cause the processor to perform a method for determining a player's skill for video games. The method includes aggregating a plurality of player statistics for match outcomes from a plurality of different video games. The method also includes calculating, for each player in a pool of players, a matchmaking rating for each player based on the plurality of player statistics, the matchmaking rating for each player comprising a predicted number of points each player will contribute to a match. The method also includes selecting, based on the matchmaking rating for each player, players from the pool of players requesting to participate in the match. The method also includes matching the players based on the matchmaking rating for each player, a sum of the matchmaking ratings comprising a total predicted team score for the match.

According to one embodiment of the present disclosure, a system is provided that includes means for storing instructions, and means for executing the stored instructions that, when executed by the means, cause the means to perform a method for determining a player's skill for video games. The method includes aggregating a plurality of player statistics for match outcomes from a plurality of different video games. The method also includes calculating, for each player in a pool of players, a matchmaking rating for each player based on the plurality of player statistics, the matchmaking rating for each player comprising a predicted number of points each player will contribute to a match. The method also includes selecting, based on the matchmaking rating for each player, players from the pool of players requesting to participate in the match. The method also includes matching the players based on the matchmaking rating for each player, a sum of the matchmaking ratings comprising a total predicted team score for the match.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
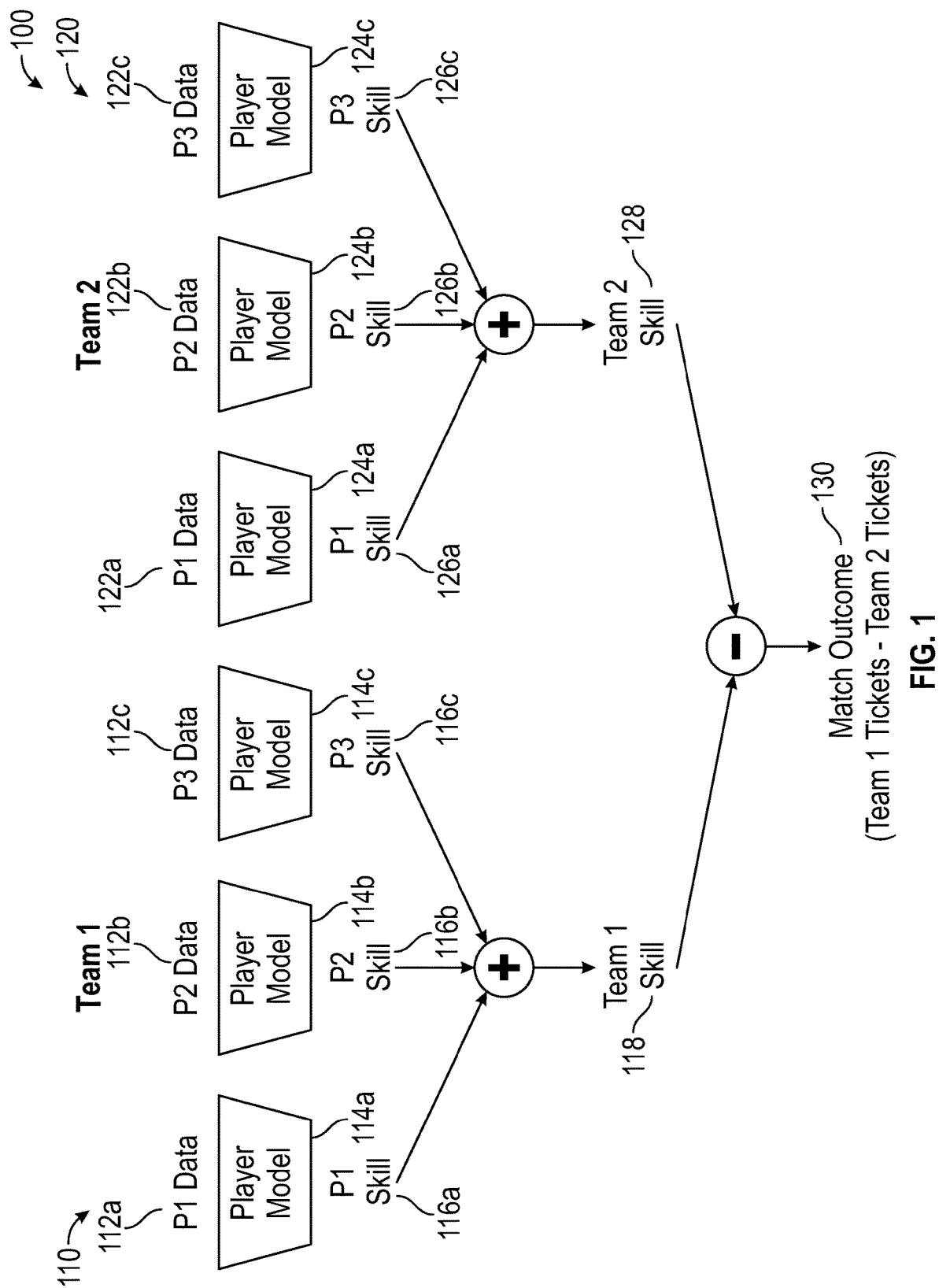
FIG. 1 illustrates an exemplary system for determining a player's skill for video games, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Video games, such as sports video games, first person shooter games, or other online games, often include a multiplayer mode allowing multiple players to connect online to interact with one another in the video game. Players may select a game mode they would like to play, and the video game may find other players looking to play the same game mode. The game will attempt to match players accordingly. However, various criteria may be utilized to match players together, and it is difficult to determine each player's skill.

Conventionally, in order to provide players a balanced multiplayer gaming experience, game developers often seek to place players of similar skill in the same matches. In order for such skill-based matching to occur, all players are typically assigned a matchmaking rating (MMR), which is a single number that summarizes the player's skill. Thus, players with similar MMRs can be matched together.

A popular method of calculating MMRs originates from the Elo rating system, where players all begin with the same MMR, which is then increased or decreased as players win or lose against each other. For example, given Player A and Player B, both of whom have the same MMR, if Player A wins, then Player A's MMR will increase and Player B's MMR will decrease. However, if Player B had a high MMR and Player A had a low MMR, and Player A unexpectedly wins, then Player A's MMR would increase by a much larger amount, and Player B's MMR would decrease by a much larger amount. Under this scheme, many players continually play against each other, and their MMRs would eventually converge to some "true" measure of their skill. However, the Elo rating system and its variants (such as the Glicko rating system) are designed for 1 vs 1 matches and are not applicable for team vs team matches.

Another shortcoming in conventional rating systems is that they only use a player's/team's win-loss history to update MMRs. However, suppose that for a particular game, it is known that a team with high shooting accuracy (or other statistic) tends to win more frequently. Conventional rating systems are not able to account for this knowledge or leverage such data because it is difficult to determine which statistics are most relevant to wins and losses for each game. Additionally, conventional rating systems are unable to keep track of every player statistic for every game, which limits their application.

Conventional approaches also share another common restriction: they analyze and output wins and losses, but are unable to differentiate between significant wins and losses (i.e., the margin of victory or defeat). In other words, Team A winning by many points over Team B is treated equally by the system as Team A winning by a hair over Team B. This is because most conventional rating algorithms are Elo-type rating algorithms that largely rely on analyzing historical match outcome data, and sequentially and incrementally adjusting player MMRs up or down based on who they win or lose against over time. For an MMR to be accurate, a player would need to have played a large number of games so that the MMR can gradually "drift" to the correct value. That is to say, MMRs can take long periods of time to converge to an accurate value and are thus not responsive to fast changes in player skill.

MMRs calculated from conventional methods also suffer from a lack of interpretability. While it is generally understood that higher MMRs correspond with higher player skill, it is uncertain how much better a player with an MMR of 30 is than a player with an MMR of 25, for example.

Accordingly, there is a need for an improved rating system that is based on data-driven skill estimation that overcomes these shortcomings. Aspects of the present disclosure address these issues by providing for systems and methods for data-driven skill estimation for matchmaking in video games. In an aspect, a Siamese neural network is trained to estimate each player's skill on an individual basis based on that player's in-game statistics and a match outcome. The Siamese neural network may then predict all player skill values and match the players accordingly so that each match is evenly balanced based on the predicted player skills.

The disclosed system addresses a problem in traditional video games tied to computer technology, namely, the technical problem of determining a player's skill level. The disclosed system solves this technical problem by providing a solution also rooted in computer technology, namely, by providing for data-driven skill estimation. The disclosed system also improves the functioning of the computer itself because it trains the computer to recognize and extract relevant information from player statistics in order to calculate player skill.

FIG. 1 illustrates an exemplary system 100 for determining a player's skill for video games, according to certain aspects of the present disclosure. The system 100 may include a first team 110 and a second team 120. The first team 110 may include a first set of players having a first set of player statistics 112a, 112b, 112c. For example, a first player on the first team 110 may have first statistics 112a, a second player on the first team 110 may have second statistics 112b, and a third player on the first team 110 may have third statistics 112c. Similarly, the second team 120 may include a second set of players having a second set of player statistics 122a, 122b, 122c. For example, a first player on the second team 120 may have first statistics 122a, a second player on the second team 120 may have second statistics 122b, and a third player on the second team 120 may have third statistics 122c. It is understood that the teams and players are exemplary only, and there may be more or less teams and/or players on each team without departing from the scope of the disclosure. It should also be understood that the player statistics can refer to historical gameplay data from video games previously played by players.

According to aspects, the first set of player statistics 112 may be input into a first set of trained neural networks 114a, 114b, 114c, and the second set of player statistics 122 may be input into a second set of trained neural networks 124a, 124b, 124c. In an implementation, the trained neural networks 114 and 124 may include trained Siamese neural networks.

The first set of trained neural networks 114 may output a first set of player skill ratings 116a, 116b, 116c, and the second set of trained neural networks 124 may output a second set of player skill ratings 126a, 126b, 126c. For example, the first player on the first team 110 may have the first skill rating 116a, the second player on the first team 110 may have the second skill rating 116b, and the third player on the first team 110 may have the third skill rating 116c. Similarly, the first player on the second team 120 may have the first skill rating 126a, the second player on the second team 120 may have the second skill rating 126b, and the third player on the second team 120 may have the third skill rating 126c.

According to aspects, the first set of player skill ratings 116 may be summed together to calculate a first team skill rating 118, and the second set of player skill ratings 126 may be summed together to calculate a second team skill rating 128. A difference between the first team skill rating 118 and the second team skill rating 128 may determine a match outcome 130. For example, if the match outcome 130 is a positive value (e.g., the first team skill rating 118 minus the a second team skill rating 128 is positive), then that means the first team skill rating 118 is higher than the second team skill rating 128, which would result in a prediction that the first team 110 will win the match. Similarly, if the match outcome 130 is a negative value (e.g., the first team skill rating 118 minus the a second team skill rating 128 is negative), then that means the first team skill rating 118 is lower than the second team skill rating 128, which would result in a prediction that the second team 120 will win the match. In other words, the team with the higher total skill rating will be predicted to win the match between the teams.

According to aspects, the player skill ratings 116, 126 (e.g., MMRs) may also be directly correlated to how many points each player will contribute to a team point total. In this way, the higher the value of each player skill rating 116, 126, the higher each team's point total will be. As a result, the team skill ratings 118, 128 are also directly correlated to how many total points each team will be predicted to score in a match between them. Therefore, the calculated difference between the team skill ratings 118, 128 may also be the predicted point difference in a final score between the teams 110 and 120. This is advantageous because it provides context as to how much each individual player may contribute to the overall point total for their team, which provides improved accuracy in not just which team will win, but also how many points that team will win by. As a result, the system 100 is able to account for the magnitude by which one team wins over another, enabling accurate calculations of player skill.

It is further understood that although the teams are illustrated as having an equal number of players, in alternatives embodiments there may be an unequal number of players on each team. For example, depending on the calculated player skills and the available players in a matchmaking pool, it may be desirable to have an unequal number of players on each team (e.g., three players in one team, and two players in another team, or any other combination).

According to aspects, video game software may be instrumented to provide for telemetry of the video games. For example, the player statistics 112, 122 may be collected and stored from instrumented video game software. In an aspect, a large variety and volume of in-game player statistics are collected and stored in a database. Conventional systems are unable to leverage such a wide variety of statistics because they do not have access to instrumented video game data. As a result, the system 100 is able to consume any number and type of in-game player statistic in any combination, thus making it generalizable and adaptable to any game (e.g., not developer specific). Additionally, because the system 100 derives skill ratings 116, 126 from player statistics (e.g., player statistics 112, 122), it is more responsive to changes in skill, and hence more accurate, for facilitating effective skills-based match balancing.

In an implementation, the system 100 may be utilized for training a model (e.g., neural networks 114, 124). For example, the system 100 may utilize past match data to train the model. According to an aspect, the past match data may be based at least in part on collected and aggregated historical player data. For example, the past match data may include a known outcome (e.g., outcome 130) between two teams (e.g., the first team 110 and the second team 120). The model may be duplicated across both teams for every player and may be trained through multiple iterations to calculate the MMR of each player on each team based on the known outcome 130 of the match. Once trained, the model may be stored for future use. Further details of the training phase are described below.

Once the model is trained, the system 100 may utilize the trained model (e.g., neural networks 114, 124, match outcomes 130) to calculate accurate MMRs for players in a pool of players to facilitate matchmaking (e.g., via a Siamese network). For example, the model may receive historical player data (e.g., player statistics 112, 122) for a player, and may output an MMR for the player. The MMRs for every player in the pool of players interested in participating in a match may be thus calculated. Once calculated, the MMRs may be utilized by a matchmaking process to match the players together based on their MMRs. For example, it may be desired to have a balanced match, and so players on the teams may be matched to have similar MMRs and/or a sum of the MMRs for the players on each team is about equal (i.e., a sum of the MMRs of the players of Team 1 is about equal to a sum of the MMRs of the players of Team 2). It is understood that the matchmaking process may prioritize different match balances, and so the players may be matched accordingly based on their calculated MMRs. Additionally, the MMR calculated in this manner may be a global MMR (e.g., a global skill rating), which may be utilized to globally match up players, and also to split the players into teams once they have been selected to a match.

In an implementation, the model (e.g., the neural networks 114, 124) may be trained based at least in part on contextual data of the players and/or their gameplay. That is, in some embodiments, the training data can include player statistics and contextual data, which can be pre-processed and input as known to those of skill in the art. For example, the aggregated player statistics 112, 122 may include (e.g., combined with, concatenated with, etc.) the contextual data. The contextual data may include, but is not limited to, in-game maps, game modes, player roles, data relating to other players, etc. associated with each player and/or their gameplay, such as the gameplay from which the aggregated player statistics 112, 122 were derived. Once trained, including with the contextual data, the model may match players based on either or both statistical and/or contextual data. For example, an MMR calculated in this manner may be a contextual MMR (e.g., a contextual skill rating) for splitting players into teams based on a context of a match. For example, it may be determined that certain players perform better/worse depending on which in-game map, game mode, player role, etc. Based on this, the players may be split into the same or different team based on their strengths/weaknesses for a balanced match based at least in part on their calculated contextual MMRs.

According to aspects, the contextual data (e.g., match specific data) may be normalized based on the player data in relation to other players' data. In an implementation, the contextual data may be included as an offset value in relation to another player. For example, a first player may have an offset value of zero, a second player may have an offset of a positive or negative integer value from zero based on the comparative contextual data of the second player in relation to the first player, and so on for each player.

According to aspects, the system 100 leverages the power of deep neural networks (e.g., neural networks 114, 124) as the algorithmic engine to predict player skill. Neural networks are modeled loosely after the human brain and are designed to recognize non-linear patterns in numerical data. Whereas conventional skill rating systems consider only a player's win/loss history or at best a restrictive set of in-game statistics to estimate player skill, neural networks are able to leverage any type of statistic in any combination to predict some arbitrary target value.

Neural networks are a type of supervised machine learning algorithm. In simple terms, if a neural network is given many images of cats and dogs and is told enough times which images are of cats and which images are of dogs, then the neural network will learn to classify images as either being of cats or dogs. The neural network is now a trained neural network, and may then be given new images of cats and dogs for accurate classification.

A similar process may be applied to train a neural network to calculate player skill. In an implementation, the neural network (e.g., the neural networks 114, 124) is given enough examples of player data to teach it that certain players are of high skill and some are of low skill and how to quantify player skill. A significant hurdle with conventional straightforward applications of neural networks, however, is that there are no "true" player skill values with which to train the neural networks to learn to predict.

For example, consider a 32 vs 32 match in an online multiplayer game. Conventionally, there is no ability to train a standard network to predict player skill from player statistics because there are no individual skill ratings with which to teach the network. In other words, the thing we need is also the thing we are trying to predict, resulting in a "chicken or egg" problem. However, it is known for each match what the match outcome is. It is also known who played in the match and each player's statistics (e.g., kill death ratio, shooting accuracy, etc.). Additionally, it is known that the calculated skill ratings will satisfy certain properties, for example: 1) the higher a team skill rating 118, 128 one team has over another team, the more points the higher-skill team should win by at match-end, and/or 2) a team's skill rating 118, 128 should be the sum of the MMRs of the players that comprise that team.

According to aspects, based on the above, a Siamese Neural Network architecture may be utilized to infer or predict player skill. Siamese neural networks are conventionally utilized for language processing and image processing. However, Siamese neural networks have not been applied to processing raw tabular data, much less skill ratings calculations, until now. Furthermore, conventional Siamese networks use only two copies of the original network, but in the described system 100, the Siamese network may be copied 64 times (e.g., 64 branches, one branch for each player/statistic), or more, depending on a size of a match.

Whereas a standard neural network takes one set of input data and outputs a single target value, a Siamese Neural Network is able to analyze multiple sets of data and output multiple targets simultaneously. For example, in the case of the above-described online multiplayer game, the Siamese network may predict all player skill values subject to the condition(s) that the difference between two team's skill ratings 118, 128 should be equivalent (or substantially equivalent, in accordance with a predetermined threshold) to the point difference between the two teams at the end of the game.

This enables the Siamese network to learn how to estimate each player's skill on an individual basis from purely that player's in-game statistics and the match outcome, without requiring a pre-existing skill rating target. In this way, the described system 100: 1) analyzes any type or combination of player statistics, 2) reacts to changes in player skill responsively, 3) leverages data about the magnitude of a team's win, and 4) provides interpretable skill ratings.

Additionally, the ability of the system 100 to generate dynamic and context-aware skill ratings, arises from training the neural network (e.g., the neural networks 114, 124) to not only accept individual player-level statistics as input, but to also accept match-specific data, such as the map or game mode of the match, as well as aggregated statistics about other players in the current match, and the like.

According to aspects, the neural network (e.g., neural networks 114, 124) may be trained through guided trial and error. For example, the neural network may be given a question and/or data, and also given the answer(s)/result(s). The neural network tries to make a prediction about what the answer is, and then, a misfit between the prediction and the answer is measured, including a degree of that error, and directionality of the error (e.g., off by a positive amount, off by a negative amount, etc.). Weights of the neural network are adjusted/updated based on the training to improve accuracy of the predictions, and over many iterations, the neural network may be trained to accurately predict results in a variety of different situations.

This trained neural network may then be copied over several times as a Siamese neural network, and utilized to train the Siamese network to predict skill ratings based on known results of matched between players/teams. For example, the trained neural network may be copied into 64 different branches of a Siamese network (e.g., to predict 64 skill ratings, a skill rating for each branch). It may then be determined how accurately the match was predicted. If the match outcome was not predicted accurately, then that error signal goes all the way back into each instance of the Siamese network. From the Siamese network's perspective, it has to figure out how to change its weights so that all of the skill ratings that it predicts (e.g., a skill rating for each player) end up becoming a more accurate representation of skills, so that the match outcome prediction can be more accurate.

In an implementation, a Siamese network may include one instance of a trained neural network copied over many times. For example, a Siamese network copied 64 times may be trained to predict 64 individual player skill ratings. The player skill ratings may then be utilized to predict the match outcome.

According to aspects, the neural networks 114, 124 may be occasionally re-trained. For example, the re-training may be based on a cadence (e.g., monthly, every two months, etc.). In an implementation, the neural networks 114, 124 may be retrained when/prior to a new software patch is/will be released. An advantage of the described system 100 is that, unlike conventional approaches that require significant maintenance to maintain accuracy, the system 100 requires very little maintenance/re-training to have a very high accuracy (e.g., 87% accuracy, or higher).

In an implementation, the aggregated player statistics 112, 122 may include information relating to margins of victory/defeat for match outcomes 130 of the players for a variety of different video games. In some embodiments, the margin of victory/defeat data can be an average margin of victory for the relevant matches. The margins of victory/defeat may be utilized to train the machine learning algorithm for increased accuracy in predicting match outcomes, beyond the training that could be achieved from win/loss or victory/defeat data that does not include margin information.

In an implementation, the match outcome 130 may include an indicator of a win or a loss (e.g., a binary indicator), or a margin of victory or defeat for each of the players for a variety of different video games. For example, a player's own average margin of victory and/or defeat across past matches may be included in an aggregated statistic for training the machine learning algorithm.

According to aspects, a total predicted score (e.g., a total predicted team score) for a match may be utilized to determine whether to re-train the machine learning algorithm. For example, a realized final score may be compared to a total predicted score at the conclusion of each match to determine the accuracy of the total predicted score. If the accuracy is below a predetermined threshold (e.g., below 90%, etc.), then the machine learning algorithm may be re-trained based at least in part on the latest match data. Additionally, match outcomes (e.g., wins/losses) may be tracked to determine how accurate a predicted match outcome was. Similarly, if the accuracy of the predicted match outcomes falls below a predetermined threshold (e.g., below 90%, etc.), then the machine learning algorithm may be re-trained. For example, the match outcomes 130 may also be utilized for training/re-training of the machine learning algorithm. In this way, the machine learning algorithm may be continuously trained and updated.

As described herein, unlike conventional MMRs that lack context, the skill ratings generated by the system 100 have a clear and simple interpretation. The player's skill rating is, in some embodiments, the number of points the system 100 expects a player to gain for their team over an opposing team. Such a transparent meaning also improves skill rating acceptance amongst a player base.

Finally, the system 100 generates skill ratings that are dynamic and context-specific. As described above, MMRs are traditionally calculated for a player without regard to the specifics of a particular match. In contrast, the system 100 provides skill ratings based on match-specific data, including considerations such as: 1) which map the match will be taking place, 2) what are the statistics of other players in the same match, 3) what game mode the match is taking place in, or the like. As a result, the system 100 is able to account for match-specific data in order to recalibrate player skill ratings for a particular match. This is especially useful for splitting a pool of players into teams having roughly equivalent skills.

Figure 2:
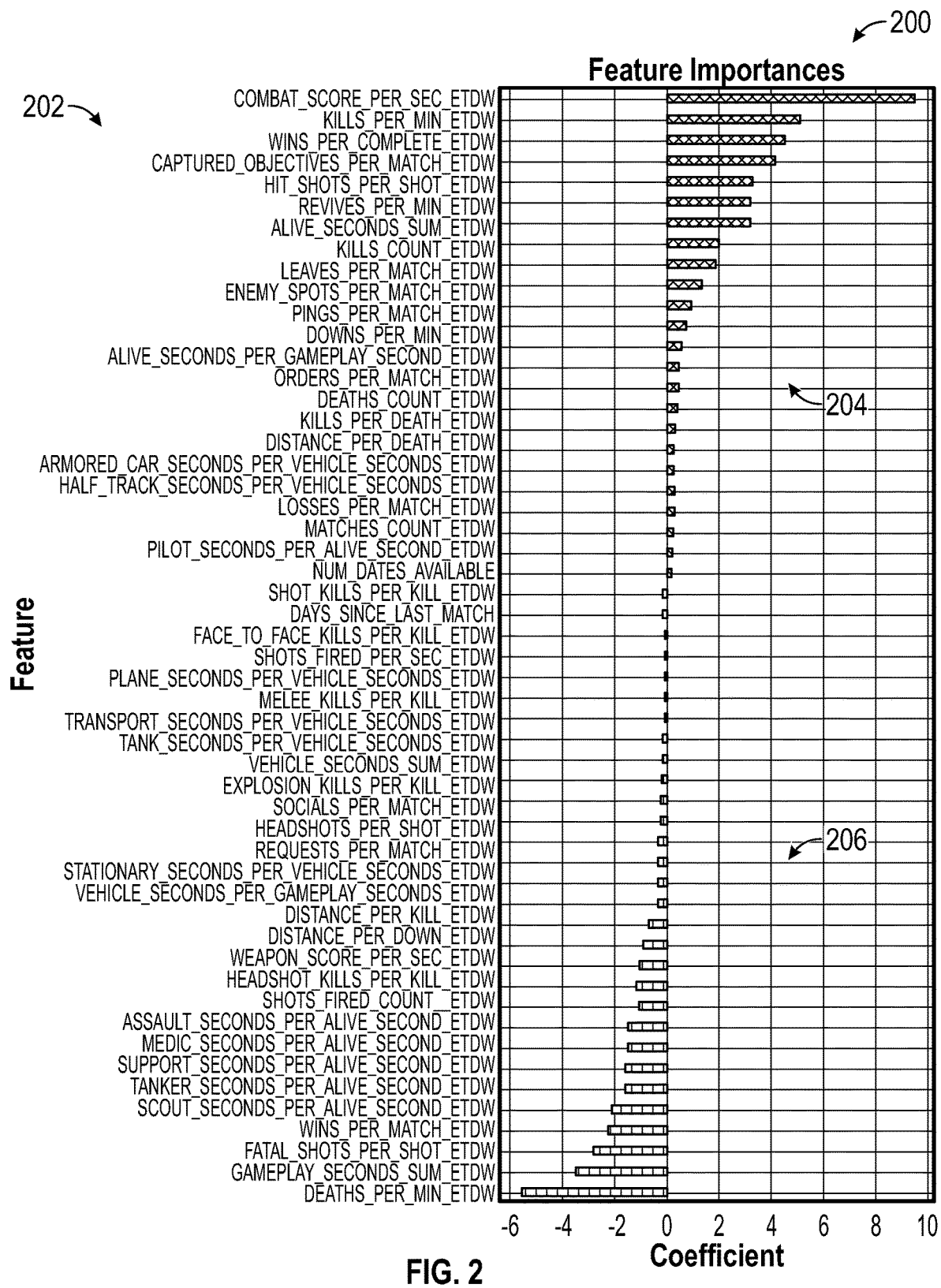
FIG. 2 illustrates exemplary player statistics, according to certain aspects of the present disclosure.

FIG. 2 illustrates a diagram 200 of exemplary player statistics 202, according to certain aspects of the present disclosure. The player statistics 202 may be generated and stored from instances of instrumented video game software. For example, the player statistics 202 may include at least one aggregated metric (e.g., kill-death ratio, shooting accuracy, etc.) of a player's in-game performance. It is understood that the illustrated player statistics 202 are exemplary only, and additional statistics may be included without departing from the scope of the disclosure.

According to aspects, the system 100 may be trained to determine a weight (e.g., a coefficient of feature importance) for each statistic 202. For example, a first set of statistics 204 may have positive coefficients, which indicate increased relevance to skill calculation. A second set of statistics 206 may have negative coefficients, which indicate decreased relevance to skill calculation.

According to additional aspects, the following statistics may have elevated importance upon activation of the feature: combat score per second, captured objectives per match, medic seconds per alive second, leaves per match, alive seconds sum, enemy spots per match, assault seconds per alive second, and/or pings per match. The following statistics may have reduced importance upon activation of the feature: losses per match, distance per kill. It is understood that the above statistics are exemplary only.

Figure 3:
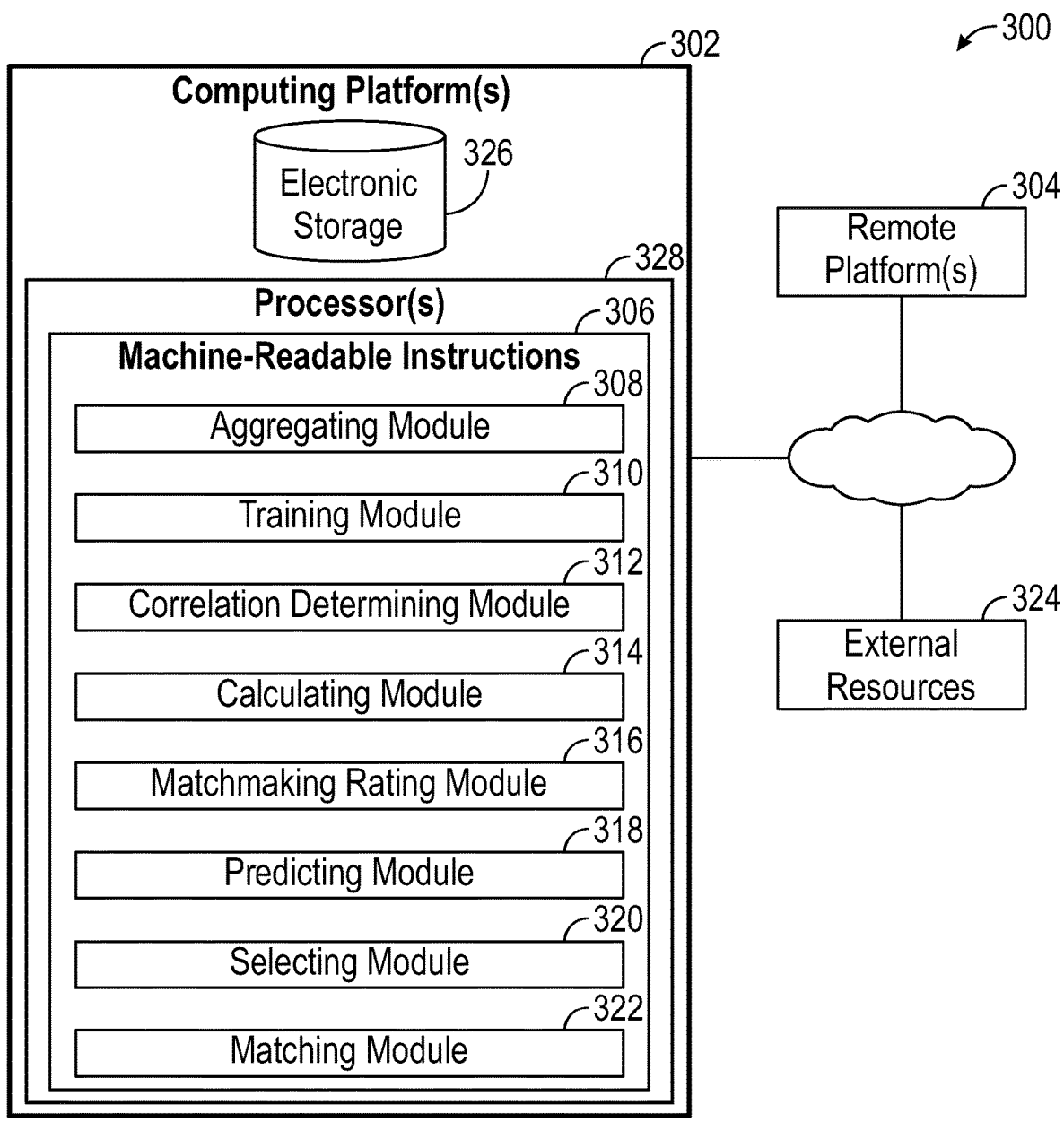
FIG. 3 illustrates a system configured for determining a player's skill for video games, in accordance with one or more implementations.

FIG. 3 illustrates a system 300 configured for determining a player's skill for video games, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of aggregating module 308, training module 310, correlation determining module 312, calculating module 314, matchmaking rating module 316, predicting module 318, selecting module 320, and/or matching module 322, and/or other instruction modules.

Aggregating module 308 may be configured to aggregate a plurality of player statistics for a plurality of different video games.

Training module 310 may be configured to train a machine learning algorithm based on the plurality of player statistics.

Correlation determining module 312 may be configured to determine a correlation between the plurality of player statistics and the match outcomes for at least one video game of the plurality of different video games.

Calculation module 314 may be configured to calculate, for each player in a pool of players, a matchmaking rating for each player based on the plurality of player statistics.

Matchmaking rating module 316 may be configured to generate the matchmaking rating for each player. By way of non-limiting example, the matchmaking rating may be based at least in part on a predicted number of points each player will contribute to a match.

Predicting module 318 may be configured to predict a number of points each player will contribute to the match.

Selecting module 320 may be configured to select, based on the matchmaking rating for each player, players from the pool of players requesting to participate in the match.

Matching module 322 may be configured to match the players based on the matchmaking rating for each player. By way of non-limiting example, a sum of the matchmaking ratings may include a total predicted team score for the match.

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software; hardware; firmware; some combination of software, hardware, and/or firmware; and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
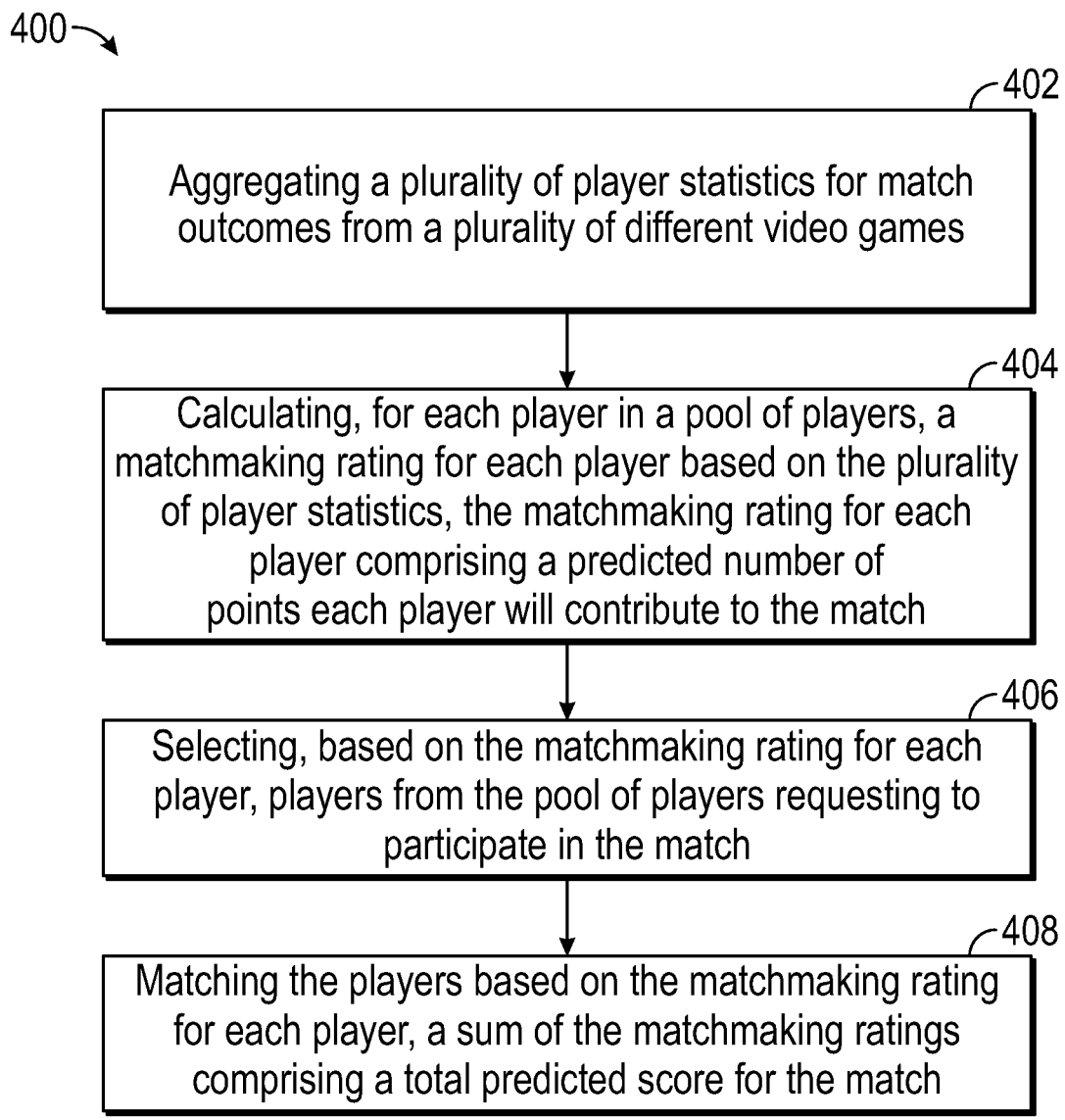
FIG. 4 illustrates an example flow diagram for determining a player's skill for video games, according to certain aspects of the present disclosure.

FIG. 4 illustrates an example flow diagram (e.g., process 400) for determining a player's skill for video games, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel.

For purposes of explanation of the subject technology, the process 400 will be discussed in reference to FIGS. 1-3.

At step 402, a plurality of player statistics are aggregated for match outcomes from a plurality of different video games.

At step 404, a matchmaking rating is calculated, for each player in a pool of players, based on the plurality of player statistics. For example, the matchmaking rating for each player may include a predicted number of points each player will contribute to a match.

At step 406, players are selected, based on the matchmaking rating for each player, from the pool of players requesting to participate in the match.

At step 408, the players are matched based on the matchmaking rating for each player. For example, a sum of the matchmaking ratings may include a total predicted team score for the match.

For example, as described above in relation to FIGS. 1-3, at step 402, a plurality of player statistics for match outcomes (e.g. player statistics 112, 122, 202) are aggregated from a plurality of different video games (e.g., through aggregating module 308). At step 404, a matchmaking rating (e.g., player skill ratings 116, 126) is calculated, for each player in a pool of players, based on the plurality of player statistics. For example, the matchmaking rating for each player may include a predicted number of points each player will contribute to a match. At step 406, players are selected (e.g., through selecting module 320), based on the matchmaking rating for each player, from the pool of players requesting to participate in the match. At step 408, the players are matched (e.g., through matching module 322) based on the matchmaking rating for each player. For example, a sum of the matchmaking ratings (e.g., team skill ratings 118, 128) may include a total predicted team score (e.g., match outcome 130) for the match.

According to an aspect the process 400 may further include receiving requests for matchmaking from a plurality of players.

According to an aspect the process 400 may further include training a machine learning algorithm based on the plurality of player statistics to determine a correlation between the plurality of player statistics and the match outcomes for at least one video game of the plurality of different video games.

According to an aspect, the training is based at least in part on contextual data comprising at least one of in-game maps, game modes, and/or player roles.

According to an aspect, the machine learning algorithm comprises a Siamese neural network. For example, the Siamese neural network may include a branch for each player.

According to an aspect, the matching is dynamic. According to an aspect, the matching is based at least in part on the contextual data.

According to an aspect, the match may include at least a first team playing against a second team, and a predicted score for each team comprises a sum of the matchmaking ratings of all the players for that team.

According to an aspect, the matching is based at least in part on player preferences.

Figure 5:
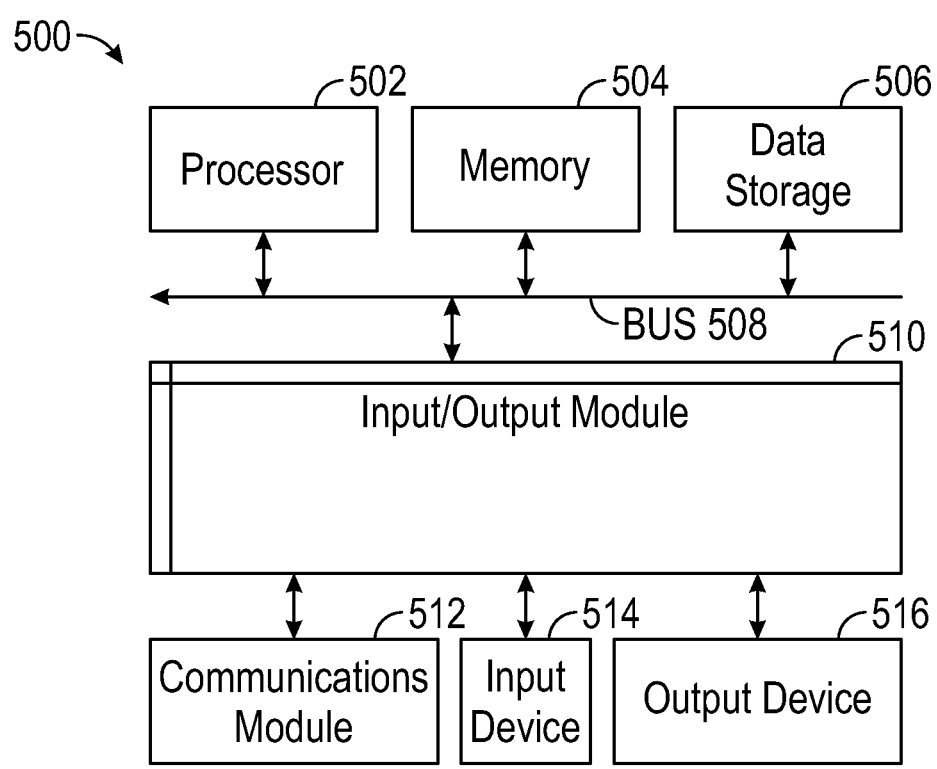
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for determining player skill for video games, comprising:
   aggregating a plurality of player statistics from a plurality of video games;
   determining, for each player in a pool of players, a skill rating for each player based on a machine learning algorithm comprising a neural network that uses the plurality of player statistics, wherein the neural network is a Siamese neural network that comprises a branch for each player; and
   matching the players in the pool to a team based on the skill rating for each player.

2. The computer-implemented method of claim 1, wherein determining a skill rating for each player comprises training the machine learning algorithm based on the plurality of player statistics to determine a correlation between the plurality of player statistics and a match outcome.

3. The computer-implemented method of claim 1, further comprising updating the machine learning algorithm based on a comparison between the predicted number of points for a team point total and an actual number of points for a team point total of a match outcome.

4. The computer-implemented method of claim 1, further comprising matching a first team to a second team to participate in a contest or match based on a match making rating for each player on a first team and a second team.

5. The computer-implemented method of claim 4, wherein a sum of the match making ratings of each player of the first team is equal to a sum of the match making ratings of each player of the second team.

6. The computer-implemented method of claim 1, wherein the skill rating for each player is based on a number points each player on the team contributes to a team total.

7. The computer-implemented method of claim 1, wherein the skill rating for a team comprises a predicted number of points each team will score in a contest or match.

8. The computer-implemented method of claim 1, wherein the pool of players request to participate in a contest or match.

9. The computer-implemented method of claim 1, wherein the plurality of video games comprises different video games.

10. The computer-implemented method of claim 1, wherein the training is based at least in part on contextual data comprising at least one of in-game maps, game modes, and/or player roles.

11. A system for determining player skill for video games, comprising: a processor; and
   a memory comprising instructions stored thereon, which when executed by the processor, causes the processor to perform:
      aggregating a plurality of player statistics from a plurality of video games;
      determining, for each player in a pool of players, a skill rating for each player based on a machine learning algorithm comprising a neural network that uses the plurality of player statistics, wherein the neural network is a Siamese neural network that comprises a branch for each player;
      matching the players in the pool to a team based on the skill rating for each player; and
      updating the machine learning algorithm based on a comparison between a predicted number of points for a team point total and an actual number of points for a team point total of a match outcome.

12. The system of claim 11, wherein determining a skill rating for each player comprises training the machine learning algorithm based on the plurality of player statistics to determine a correlation between the plurality of player statistics and a match outcome.

13. The system of claim 11, wherein the processor further performs matching a first team to a second team to participate in a contest or match based on a match making rating for each player on a first team and a second team.

14. The system of claim 13, wherein a sum of the match making ratings of each player of the first team is equal to a sum of the match making ratings of each player of the second team.

15. The system of claim 11, wherein the skill rating for each player is based on the number points each player on a team contributes to a team total.

16. The system of claim 11, wherein the skill rating for a team comprises a predicted number of points each team will score in a contest or match.

17. The system of claim 11, wherein the plurality of video games comprises different video games.

18. The system of claim 11, wherein the training is based at least in part on contextual data comprising at least one of in-game maps, game modes, and/or player roles.

19. A non-transitory computer-readable storage medium comprising instructions stored thereon, which when executed by one or more processors, cause the one or more processors to perform operations for determining player skill for video games, the operations comprising:
- aggregating a plurality of player statistics from a plurality of video games;
- determining, for each player in a pool of players, a match making rating for each player based on a machine learning algorithm comprising a neural network that uses the plurality of player statistics wherein the neural network is a Siamese neural network that comprises a branch for each player;
- matching the players in the pool to at least a first team and to a second team to participate in a contest or match based on a match making rating for each player on a first team and a second team; and
- updating the machine learning algorithm based on a comparison between a predicted number of points for a team point total and an actual number of points for the team point total of a match outcome.

\* \* \* \* \*